United States Patent [19]
Colomb

[11] Patent Number: 4,511,928
[45] Date of Patent: Apr. 16, 1985

[54] SYSTEM AND METHOD FOR HIGH QUALITY IMAGE REPRODUCTION WITH GRAYSCALE IMAGE PRINT WHILE STORE CAPABILITY

[75] Inventor: Denis G. Colomb, Boca Raton, Fla.

[73] Assignee: Sonics Research Corporation, Fort Lauderdale, Fla.

[21] Appl. No.: 408,567

[22] Filed: Aug. 16, 1982

Related U.S. Application Data

[63] Continuation-in-part of Ser. No. 182,886, Aug. 29, 1980, Pat. No. 4,345,276.

[51] Int. Cl.³ .................... H04N 1/40; H04N 1/32
[52] U.S. Cl. ................................ 358/280; 358/257; 358/903; 364/519
[58] Field of Search ........... 358/280, 258, 256, 257, 358/260, 903; 364/518, 519, 523

[56] References Cited

U.S. PATENT DOCUMENTS

| | | |
|---|---|---|
| 4,196,450 | 4/1980 | Miller et al. ............ 358/256 |
| 4,240,119 | 10/1980 | Norton et al. .......... 358/297 |
| 4,303,948 | 12/1981 | Arai et al. ............. 358/287 |

Primary Examiner—Howard W. Britton
Assistant Examiner—John K. Peng
Attorney, Agent, or Firm—John J. Byrne; Bradford E. Kile

[57] ABSTRACT

A system and method for reproducing images on a printer in printed form employs a primary microprocessor and a printer control microprocessor to achieve a "print while store" capability. Digital data corresponding to the images to be reproduced are received and stored by the first microprocessor which processes the data as well. When printing is desired, the data is transferred by the primary microprocessor to a printer buffer memory, and is then retrieved and printed by a gray line printer under the control of a printer control microprocessor. In accordance with the "print while store" capability, the latter operation of the printer control microprocessor can take place even while further image data is being acquired. Contention between the primary and printer control microprocessor is avoided by providing the printer control microprocessor with an "inhibit" capability.

15 Claims, 10 Drawing Figures

SYSTEM AND METHOD FOR HIGH QUALITY IMAGE REPRODUCTION WITH GRAYSCALE IMAGE PRINT WHILE STORE CAPABILITY

REFERENCE TO RELATED APPLICATION

This is a continuation-in-part of Ser. No. 182,886 filed on Aug. 29, 1980, now U.S. Pat. No. 4,345,276 issued on Aug. 17, 1982.

BACKGROUND OF THE INVENTION

1. Field of the Invention

The present invention generally relates to a system and method for high quality image reproduction. In particular, the invention relates to a system and method wherein received image-representing signals are processed to obtain resulting processed data, the resulting processed data is stored, the data thus stored is selectively read out in accordance with operator controlled inputs, and the data thus read out is utilized, in accordance with a gray line printing technique, to produce a high quality reproduction of the original image. An important advantage of the inventive system and method resides in the grayscale image "print while store" function.

2. Description of the Prior Art

There has been an increasing need within various medical, scientific and technical disciplines, for a technique and system for high quality image reproduction. The need for such an imaging technique has, in recent years, been satisfied by the system and method for high quality image reproduction disclosed in the aforementioned copending application Ser. No. 182,886 filed on Aug. 29, 1980, now U.S. Pat. No. 4,345,276 issued on Aug. 17, 1982.

Before the development of the method and system of the copending application, prior art systems were characterized by several substantial drawbacks: (1) prior art systems were quite slow, since various different processes (both automatic and manual) had to be interfaced; (2) prior art systems were inaccurate, this being the result of such factors as optical distortion and lack of accurate and automatic control of brightness, exposure, focus, etc.; (3) prior art systems produced reproductions of limited quality, the quality of reproduction being limited by the type of film employed, as well as the overall characteristics of the system; (4) prior art systems employed analog positioning systems which introduced error, involved interface of electrical, mechanical and manual operations, and were quite often very crude in their operation; and (5) finally, prior art systems were costly due to size and complexity, as well as maintenance and overhead associated with operation of the system, especially when the system was operated on a large scale.

The system and method of the present invention eliminated, to a very great extent, the analog processing, mechanical and optical operations which characterized systems of the prior art, and which caused such systems of the prior art to be hampered by disadvantages in the form of lack of speed, accuracy, quality and economy in system development and operation. More specifically, the system of the copending application took advantage of sophisticated digital processing technology, and implemented such technology so as to develop an integrated, self-contained system for high quality image reproduction. The result was a system which was not only automated but flexible. For example, users of the system of the copending application are able to introduce several different images (in the form of image-representing signals) into the system, and then to reproduce those images in any given order or arrangement on a simple printed sheet. As a further example, a user of the system can introduce a single image into the system, and can then easily obtain any number of direct duplicates arranged in any desired array on a printed sheet. Thus, the system and method of the copending application were and are sufficiently flexible to accommodate various modes of image reproduction, including those involving multi-formatting, while providing a true, high quality, analog-type image on paper.

Moreover, the system and method of the copending application provides a type of multi-formatting which is sufficiently flexible to allow various modes of image reproduction, including automatic image rotation (for example, through 90 degrees) prior to image reproduction. Of course, other modes of image reproduction may be employed to meet special requirements, such as those related to cardiac diagnosis (for example).

However, the system and method of the copending application were originally designed to incorporate a certain type of printer, specifically a Bell & Howell Model 912 printer. Subsequently, it has been deemed more desirable to utilize a Muirhead Electrostatic Printer, Model M-136 to replace the original printer in order to provide a superior quality image at a lower product cost. However, as is well known in the art, printers such as the Muirhead Printer operate at a much slower speed.

Therefore, it was recognized that it was highly desirable to redesign and improve on the system and method of the copending application in order to accommodate slower speed printers. In the process, it was further recognized that it was highly desirable to provide the system and method for high quality image reproduction with a "print while store" capability. Thus, whereas the previous system and method utilizing the Bell & Howell-type printer sequentially stored and printed grayscale images, the present system and method simultaneously store and print grayscale images using a lower cost, slower speed printer (such as the Muirhead Printer).

SUMMARY OF THE INVENTION

The present invention generally relates to a system and method for high quality image reproduction. More specifically, the invention relates to a system and method, wherein image-representing signals are received and processed in order to obtain resulting processed data, the resulting processed data is stored and then selectively read out in accordance with operator controlled inputs, and the selectively read out data is utilized, in accordance with a gray line printing technique, to produce a high quality reproduction of the original image.

As will be seen in the detailed description below, the system and method of the present invention represent a redesign of the original system and method disclosed in the copending application, such that the system and method for high quality image reproduction now has the capability of utilizing printers of lower product cost but slower speed, the system and method of the present invention being provided with a "print while store" capability whereby grayscale images are simultaneously stored and printed. This new "print while store" function is implemented as the result of the addition of a second microprocessor and associated circuitry, the latter functioning as a "printer controller" for controlling the printer (start, stop, etc.) and transmitting grayscale image date to the printer.

Therefore, it is an object of the present invention to provide a system and method for high quality image reproduction having a grayscale image "print while store" capability.

It is a further object of the present invention to provide a system and method for high quality image reproduction wherein grayscale images are simultaneously stored and printed.

It is a further object of the present invention to provide a system and method for high quality image reproduction wherein an additional microprocessor and associated circuitry are used to achieve a "print while store" capability.

It is a further object of the present invention to provide a system and method for high quality image reproduction wherein slower speed and less costly printers can be utilized.

The above and other objects that will hereinafter appear, and the nature of the invention, will be more clearly understood by reference to the following description, the appended claims, and the accompanying drawings.

BRIEF DESCRIPTION OF DRAWINGS

FIG. 1b is a detailed diagram of the control console of the unit of FIG. 1a.

FIGS. 3a, 3b, 3c, 3d, and 3e are flow charts of the operations performed by the micro-processor 80 of FIG. 2a.

DETAILED DESCRIPTION

The present invention will now be described in more detail, with reference to FIGS. 1a and 1b, which depict the unit and control console, respectively, which implement the system for high quality image reproduction.

Figure 1A:
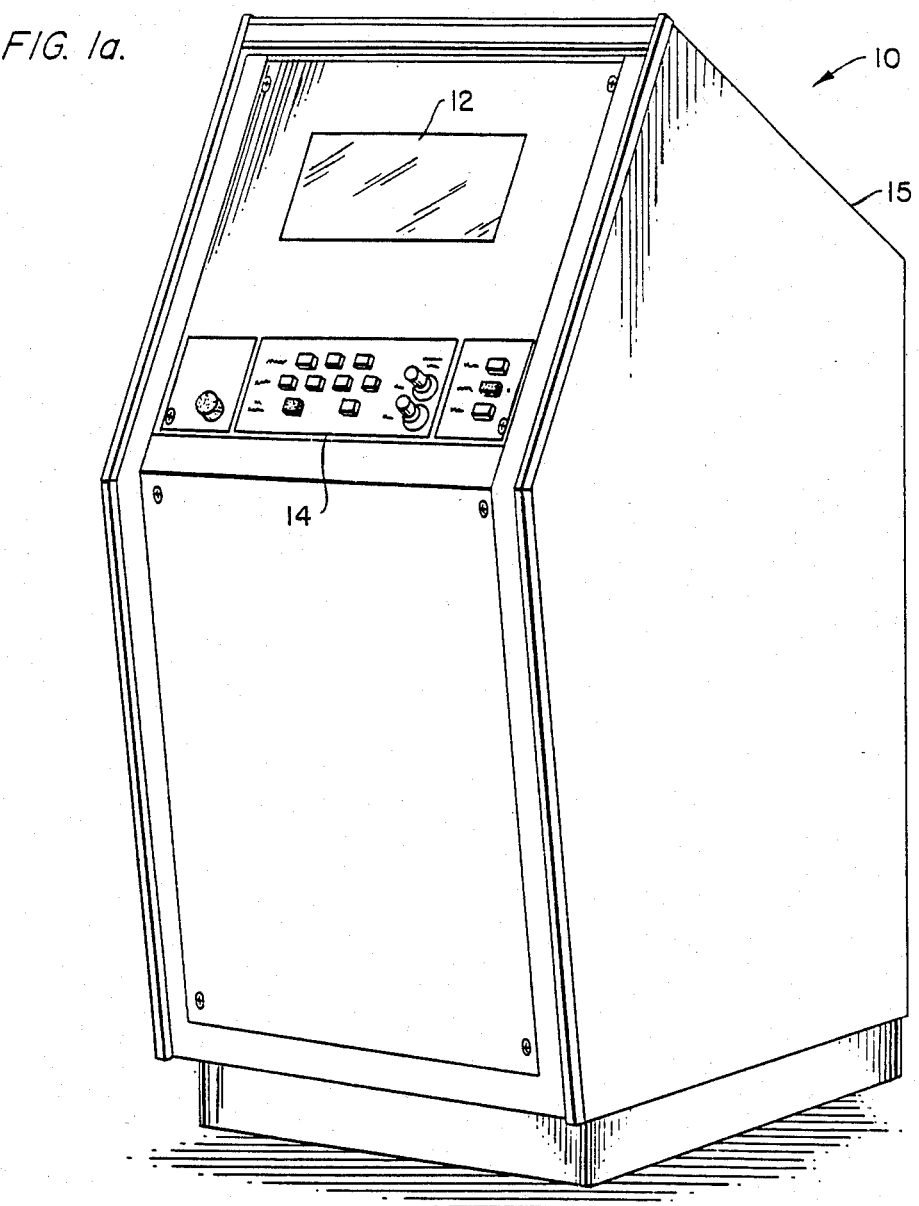
FIG. 1a is a perspective view of an image reproduction unit in accordance with the present invention.

Referring to FIG. 1a, the unit 10 basically comprises a viewing window 12 and a control console 14, the latter being arranged within a housing 15, the housing 15 containing the gray line printer (to be discussed in detail below) and associated electronics.

Figure 1B:
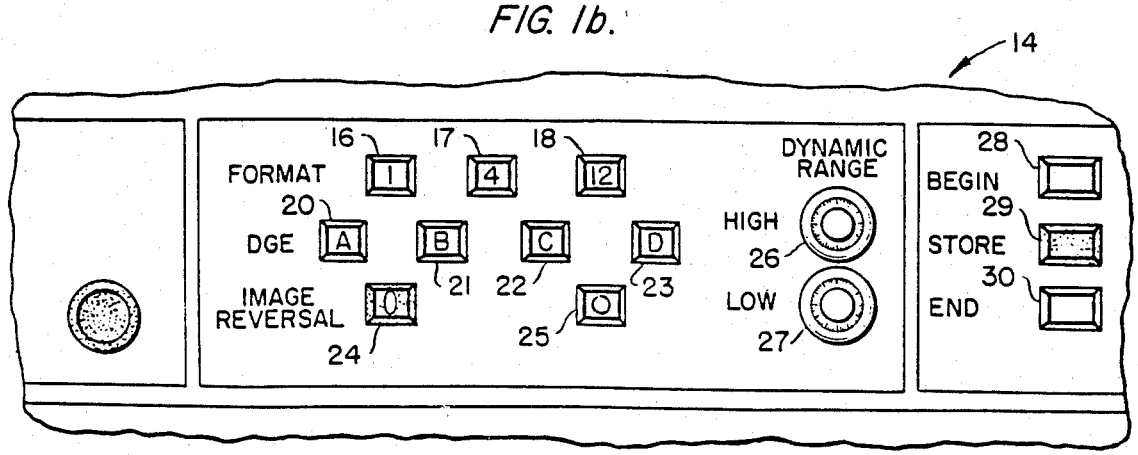

The control console 14 of the unit 10 is shown in more detail in FIG. 1b, and includes format controls 16 through 18, digital grayscale enhancement controls 20 through 23, image reversal controls 24 and 25, dynamic range controls 26 and 27, and operator controls 28 through 30.

Format controls 16 through 18 are employed to provide the operator with a means for selecting various formatting modes. Thus, control 16 is utilized to establish 1× formatting, by means of which a single large format picture is printed during a standard print cycle by the gray line printer. Control 17 provides the operator with the ability to select 4× formatting, by means of which two images may be printed simultaneously. In a preferred embodiment of the invention, the two images printed simultaneously are rotated 90 degrees with respect to the printing page, this rotation being carried out in order to maintain a true aspect ratio. More specifically, the pictures to be printed out in the 4× formatting mode will not physically fit on the standard printing page (for example, 11 inches in width). Therefore, each of the pictures is rotated 90 degrees in order to facilitate printing on a single page without loss of the true aspect ratio.

Control 18 provides the operator with the ability to select 12× formatting, by means of which 12 pictures may be printed on a single sheet of printed paper, with three small size pictures being printed on each of four lines. The pictures printed out in the 12× formatting mode are printed in their normal orientation, that is, without rotation (as was the case in the 4× mode).

The digital grayscale enhancement (DGE) controls 20–23 permit the operator to select the number of shades of gray to be included within the digital grayscale. Thus, by operation of control 20, the operator indicates 16 discrete levels of gray (the maximum number of levels in the system) which are to be included within the digital grayscale. As will be seen in the more detailed discussion below, the 16 levels are quantized by digitization of the video input signal. Thus, actuation of control 20 causes the system, upon analyzing the video input signal, to quantize the video input signal in accordance with 16 discrete levels.

Operation of control 21 permits the operator to select eight shades of gray (as opposed to 16) to be included within the digital grayscale. In the preferred embodiment, this is accomplished by assigning the first two levels of the normal 16-level grayscale to the first level of the 8-level scale selected, with subsequent pairs of levels in the 16-level scale being assigned as a single level in the 8-level scale. Thus, shades 1 and 2 in the A scale (the normal 16-level scale) will be assigned as shade 1 in the B scale, shades 3 and 4 in the A scale will be assigned as shade 2 in the B scale, and so forth, until shades 15 and 16 in the A scale are assigned as shade 8 in the B scale.

Operation of control 22 permits the operator to select a 4-level (C) scale, such that shades 1 through 4 in the A scale will be assigned as the first level in the C scale, shades 5 through 8 in the A scale will be assigned as the second level in the C scale, and so forth.

Finally, actuation of control 23 permits the operator to select a 2-level scale (the D scale), such that the first eight shades in the A scale will be assigned as a first level (corresponding to white), and the last eight shades of the A scale will be assigned as the second level (black) of the D scale.

It is to be noted that, in the normal DGE mode (the A scale of 16 shades), a picture will have a very homogeneous and even blend from black to white. Discrete steps between the various gray shades will not be visible. By switching to the second DGE mode (corresponding to the B scale), the shades of gray will be more absolutely quantized so that exact boundaries may be seen between the levels. Thus, whereas an incoming video signal will be printed in accordance with scale A as an image having a very homogeneous and even blend, when scales B, C or D are chosen, the particular amplitude levels will be absolutely outlined by a border representing a discrete step between one shade of gray and the next. However, it is to be recognized that, in certain applications, choice of the A scale is more appropriate, while in certain other applications, choice of the B, C or D scales is indicated. For example, in certain studies relating to the detection of echoes within a liver or a kidney, or in certain other studies relating to the detection of bright areas in a nuclear medicine study, the choice of DGE scales B, C or even D can be quite helpful to those interpreting the resulting images. However, it is to be recognized that a principal advantage of the present system and method resides in the fact that such tasks (liver, kidney or nuclear medicine studies) are usually accomplished at present by the use of extremely fast, expensive, time-consuming, large-scale hardware and software systems. In contrast, because the system and method of the present invention involve a very discrete digital machine, these same tasks can be accomplished very quickly and relatively inexpensively, and will result in a picture which is ready for viewing in a short time, thus taking into account "real world" considerations involved in obtaining and interpreting such images.

The image reversal controls 24 and 25 provide the operator with a means of reversing the printing of an image, so as to selectively obtain either positive or negative images. Thus, actuation of one of the controls 24 and 25 results in an image in which the particular background being viewed may be printed white or clear and the image itself may appear as varying tones of gray from white to black. In a reversal of the same image, the background may be dark black and the image may be viewed as a total transition from black to white, so that, in one form, the image itself appears to be dark shaded gray, and, in the next form, the picture may seem to be light going from one shade of light to white. Such reversals of the image polarity may be quickly obtained by operator actuation of one of controls 24 and 25. Dynamic range controls 26 and 27 offer the operator the flexibility of adjusting the white and black cutoff points in video separately, so that an operator may lighten or darken the black background, but not affect directly the shape or form, the reference levels of white, etc. In this manner, a white level may be set up and established, and yet a black level may be shifted in and out, darker and lighter, with no direct effect on the white level. The same is true with respect to a fixed black level, with the white being adjustable so that it is lighter or darker (meaning not visible, or with more and more shades of gray appearing as background), without directly affecting the black level.

The final three controls 28 through 30 of the console 14 are considered operator interface buttons, and provide the operator with the means for instructing the system to "begin", "store" and "end". Specifically, control 28 is pressed by the operator in order to begin system operation, with the result that a picture frame counter in the system (to be discussed in more detail below) is reset. It is to be noted that, in a preferred embodiment of the inventive system, the top left hand corner of each picture contains a number, this number being in numerical sequence and having a direct relationship to the number of pictures that have been printed. Even in changing format size, this number is maintained, and the only time the number can be zeroed is upon sequential actuation of control 30 ("end") and control 28 ("begin"). Thus, the function of control 28 is merely to simultaneously reset the frame counter (to be discussed in detail below) to zero.

Control 29 (the "store" control) provides a "real world" interface to the processor of the inventive system, and instructs the processor to make the present picture available in the form of a video signal, digitize that signal, and store the resulting digitized picture. In the 4× and 12× modes of operation (involving multi-formatting, as discussed above), the control 29 has two functions. In the 4× mode of operation, pressing control 29 upon occurrence of a first picture frame causes that first frame image to be stored in memory, and pressing control 29 for a second frame causes the second frame to be stored also. Then, the first and second frames are simultaneously printed directly from the memory in which they were stored. As a result, two images are simultaneously printed in parallel. Moreover, pictures 3 and 4 are handled in the same manner, with pictures 3 and 4 being stored in memory. Then, pictures 3 and 4 are concurrently recalled from memory, line by line, and printed out in parallel.

In the 12× mode of operation, the first two pictures provided to the system are stored therein and the third picture is then printed in real time. However, at the same time, pictures 1 and 2 are recalled from memory and printed out simultaneously and in parallel with picture 3. A similar procedure takes place with respect to pictures 4, 5 and 6, each of these pictures being printed out in real time and in parallel.

Control 30 (the "end" control) is the means by which the operator instructs the system to terminate the present study. In a preferred embodiment, upon termination of such a study, a test pattern is printed with demographic information available (for example, patient name, bed number, room number, etc.), so that the particular pack of images may be identified as corresponding to a particular patient. The test pattern is provided in order to actually insure quality control of the printing process, and so that there is no question at a later time as to whether the machine was working at the beginning of the study. This test pattern is generated at the end of each study, and the test pattern is utilized for the following study as well.

Having described the basic functions of the various controls contained in the control console 14 of the unit 10, further description of the functions provided in accordance with the inventive system and method will be covered in more detail below, as this detailed description proceeds.

Figure 2A:
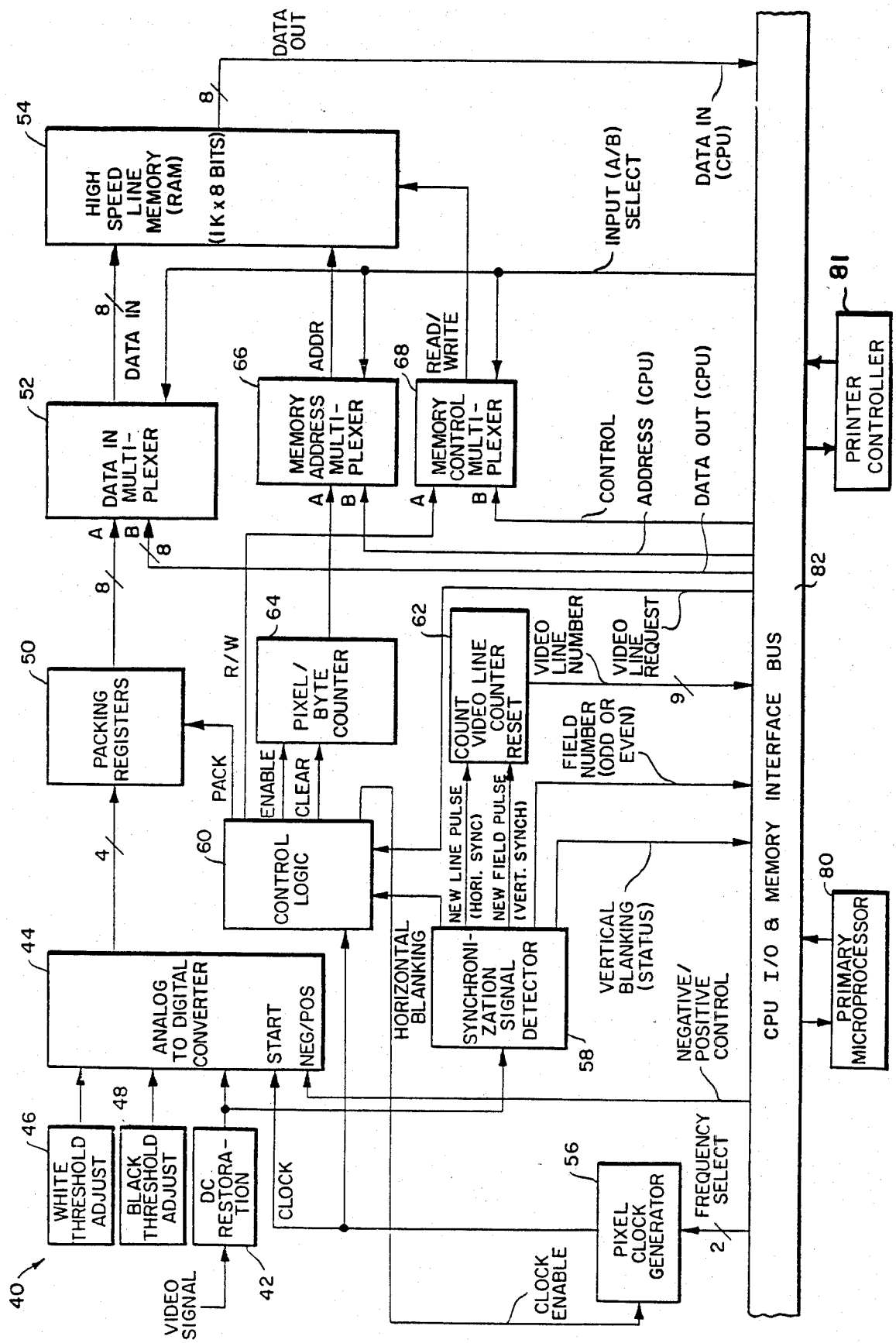
FIGS. 2a and 2b are block diagrams of the system of the present invention.
Figure 2B:
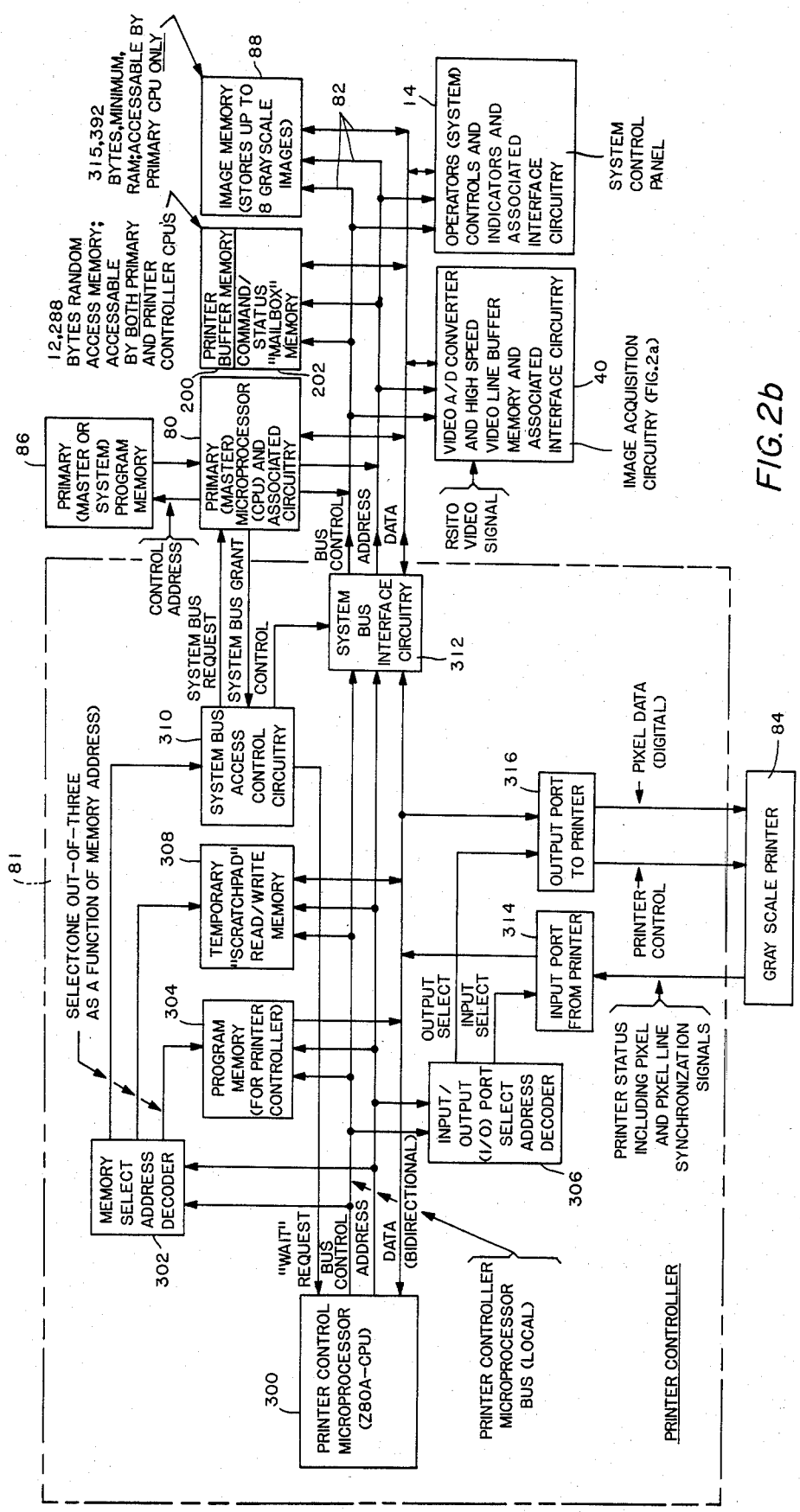

FIGS. 2a and 2b are block diagrams of the overall system of the present invention.

Referring to FIG. 2a, the overall system of the present invention is seen to comprise grayscale image acquisition circuitry 40, which includes a DC restoration circuit 42, an analog-to-digital converter (ADC) 44, white and black threshold adjust circuits 46 and 48 (respectively), digital packing registers 50, data in multiplexer 52, a high speed line memory (random access memory or RAM) 54, a pixel clock generator 56, a synchronization signal detector circuit 58, a line store control logic 60, a video line counter 62, a pixel/byte counter 64, a memory address multiplexer 66, and a memory control multiplexer 68. The aforementioned elements are connected to microprocessor 80 and printer control microprocessor 81 via interface bus 82.

As seen in FIG. 2b, the system of the present invention also includes the system control panel 14 (described above with respect to FIG. 1b), a grayscale image printer 84, a primary program memory 86, a grayscale image memory 88, a printer buffer memory 200, a printer command/status "mailbox" memory 202, as well as the grayscale image acquisition circuitry 40 (described in FIG. 2a), the primary microprocessor 80, and the printer controller 81. As also seen in FIG. 2b, the printer controller 81 comprises a printer control microprocessor 300, memory select address decoder 302, program memory (for printer control) 304, input-/output port select address decoder 306, temporary "scratch pad" read/write memory 308, system bus access control circuitry 310, system bus interface circuitry 312, input port 314 and output port 316.

Operation of the system 40 will now be explained in detail with reference to FIGS. 2a and 2b. The RS 170 video signal (provided, for example, from an RS 170 signal generator or from a conventional video camera) is provided to a DC restoration circuit 42 which restores the video signal to a base line DC level, that is, establishes a zero base line for the signal. The DC restoration circuit 42 is a conventional restoration circuit which is also provided with an impedance driver (not shown), by means of which the analog video output signal of restoration circuit 42 is sent in two different directions. Preferably, the D.C. restoration circuit 42 is of the type which will accommodate a standard wideband video input signal.

The output of the DC restoration circuit 42 is provided (in accordance with the first direction) to ADC 44, which may be implemented by an integrated circuit such as the TDC 1021J chip (manufactured by TRW, Inc.). More specifically, the ADC 44 is a 20 MHz flash analog-to-digital converter which requires no sample-and-hold function and very little buffering. Upon receipt of a "start convert" command, the ADC 44 performs analog-to-digital conversion so as to convert the analog video signal into a four-bit digital output, provided to digital packing registers 50.

ADC 44 receives a white threshold adjust signal and a black threshold adjust signal from adjustment circuits 46 and 48, respectively, and utilizes these inputs to quantize the analog video signal in accordance with a desired number of gray levels. Accordingly, the four-bit parallel output of ADC 44 has the capability of defining a maximum of 16 different gray levels of the analog video input. In the ADC 44 the start of each new conversion cycle is dictated by a clock input (designated PIXEL CLOCK), received from the clock generator 56. Moreover, the ADC 44 receives a negative/positive control input from the bus 82, as a result of which the ADC 44 either produces a video digital signal corresponding to a positive image, or by means of a one's complement procedure produces a digital signal representing a negative image.

Digital packing registers 50 are typical eight-bit buffer registers (such as the LS 377). Registers 50 receive and pack each successive pair of four-bit parallel signals from the ADC 44, and provide a corresponding eight-bit digital video output to multiplexer 52. More specifically, a first conversion performed by the ADC 44 results in conversion of one pixel of the video signal input into a digital video output (four bits); a second conversion results in the provision of a second digital video output corresponding to a second pixel, and this four-bit output is also provided to the packing registers 50. Registers 50 then provide two pixels worth of video digital output to the multiplexer 52. The packing function which results in an eight-bit output is necessary in order to achieve efficiency of operation of the overall system, inasmuch as the microprocessor 80 is an eight-bit machine.

Multiplexer 52 performs a multiplexing operation with respect to data input to the high speed line memory or random access memory (RAM) 54. Specifically, multiplexer 52 responds to a control input INPUT-(A/B)SELECT received, via bus 82, from microprocessor 80 to selectively provide a data path from either the digital packing registers 50 or the bus 82 to the memory 54. In the first case, data corresponding to newly digitized video information is being provided to the memory 54 in real time; in the second case (for example, in the multi-formatting mode), previously stored digital information (as stored in grayscale image memory 88 (FIG. 2b)) is provided via the bus 82 and multiplexer 52 to the memory 54. This has been discussed above in connection with use of controls 17, 18 and 29 to achieve a multi-formatting capability in the $4\times$ or $12\times$ modes.

Line memory 54 is controlled in its input and output operations by a control input READ/WRITE, provided via multiplexer 68 from either line store control logic 60 or the bus 82. Line memory 54, operating at high speed, clocks out the digital video stored therein, providing the same to the bus 82, for subsequent provision to either the printer buffer memory 200 (FIG. 2b) or the grayscale image memory 88. Whether or not the data is provided to the printer buffer memory 200 or to the memory 88 is determined by whether or not the system is in the print mode or the store mode.

The timing for the operation of the system of FIG. 2a is provided by the clock generator 56, synchronization signal detector circuit 58, line store control logic 60, video line counter 62 and pixel/byte counter 64, operating to provide control signals via multiplexer (for memory address) 66 and multiplexer (for memory control) 68. Operation is as follows.

Synchronization signal detector circuit 58 receives the analog video output of DC restoration circuit 42 and, in a manner described in the aforementioned co-pending application (which is incorporated herein by reference), derives various control outputs from the sync signal conventionally associated with the video signal. More specifically, detector circuit 58 detects the presence of the sync signal, and determines when the scanner in the video camera (not shown) is in the "horizontal blanking" mode (for example, at the end of the scanning of a line) or the "vertical blanking" mode (for example, at the end of the scanning of a frame), or is at the beginning of a new line (as indicated by a horizontal sync pulse) or at the beginning of a new field (as indicated by a vertical sync pulse). Detector circuit 58 produces various control outputs, and provides these outputs to various other elements. Specifically, output HORIZONTAL BLANKING is provided to line store control logic 60; output NEW LINE PULSE is provided to the COUNT input of video line counter 62; output NEW FIELD PULSE is provided to the RESET input of video line counter 62; and output VERTICAL BLANKING is provided via the bus 82 to the microprocessor 80 as a status signal.

Video line counter 62 counts the number of lines (corresponding to input NEW LINE PULSE) between consecutive vertical sync signals (NEW FIELD PULSE), and provides an indication of the video line number to the bus 82. In this manner, the processor 80 is able to supervise the system, and to be aware of the actual video line number being scanned at each instant. Similarly, detector circuit 58 provides an output FIELD NUMBER, corresponding to the number of the field being scanned, thus keeping the processor 80 apprised of this information as well. As will be seen in more detail below, with this information available, the microprocessor 80 is able to compensate for the fact that the video camera (not shown) scans at a much higher rate relative to the speed of operation of the system. That is to say, since the various operations performed by the system (for example, the analog-to-digital conversion operation) are performed at a slower speed than the scanning of the video camera, it is necessary for the system (via the video line counter 62 and the microprocessor 80) to keep track of the video line number of the line just scanned (relative to which the data is being digitized and stored), so that, despite the number of scans performed in the intervening time, the next analog video information sampled and digitized by ADC 44 will correspond to the next succeeding video line.

The line store control logic 60 is described in more detail in the aforementioned copending application. Control logic 60 receives the signal PIXEL CLOCK from the generator 56, thus being advised of each start of a conversion process. Moreover, control logic 60 receives a horizontal blanking input from the detector circuit 58, as well as a video line request signal via bus 82 from the microprocessor 80. Control logic 60 processes these inputs so as to develop various outputs: output ENABLE provided to enable the operation of the pixel/byte counter 64; a CLEAR output for the purpose of clearing the counter 64; an output CLOCK ENABLE for the purpose of enabling the clock generator 56; an output PACK for controlling the packing of digital data in registers 50; and an output R/W provided to the multiplexer 68, so that the control logic 60, in a certain system mode of operation, controls the operation (read or write) of the line memory 54.

Referring to FIG. 2b, the system control panel 14 receives various control inputs and provides various status outputs, and has been described in detail above with reference to FIGS. 1a and 1b. It is to be noted that system control panel 14 comprises any conventional control panel for providing control panel signals and displaying status signals, the manner of forming these control status functions being obvious to those of skill in the art.

The primary microprocessor 80 controls the acquisition and storage of grayscale images, and also interfaces to the operator via the interface 82 and operator control panel 14. Primary microprocessor 80 is connected to the primary program memory 86, from which it receives instructions, and to which it transmits control information. Microprocessor 80 also is interconnected, via the bus 82, with the grayscale image memory 88, the grayscale image acquisition circuitry 40, and the system control panel 14. Furthermore, in accordance with the invention, the primary microprocessor 80 also interconnects, via the bus 82, with the printer buffer memory 200 and the printer command/status "mailbox" memory 202. Both data and control information flow through the bus 82 between the primary microprocessor 80 and the aforementioned elements.

The printer controller 81 includes microprocessor 300 which is interconnected directly with printer control program memory 304, from which instructions are received by the microprocessor 300, and to which control information is transmitted by the microprocessor 300. Moreover, the printer control microprocessor 300 is interconnected via ports 314 and 316 with the grayscale image printer 84, to which both printer control and image data are provided by the microprocessor 300. Finally, printer control microprocessor 300 is interconnected, via the interface circuitry 312 and system bus 82, with the printer buffer memory 200 and the printer command/status "mailbox" memory 202, and both data and control information flow through the bus 82 between the printer control microprocessor 300, on the one hand, and the printer buffer memory 200 and printer command/status "mailbox" memory 202, on the other hand.

The grayscale image printer 84 receives various control data, pixel data, and (if desired) ASCII character data from, and provides various status signals to, the microprocessor 300 (via ports 314 and 316, respectively). The printer 84 is, in the preferred embodiment, a Muirhead Printer, Model M-136, or similar device. The printer 84 produces a high quality grayscale image, as well as line graphics and alphanumeric printouts, at relatively low product cost. The printer 84 produces 16 shades of gray (from white to solid black), with each step being aligned accurately by means of a four-byte digital command.

Further referring to FIG. 2b, the program memory 86 may be any conventional read-only memory or read-write memory suitable for storing micro-instructions for implementation by the microprocessor 80. Similarly, the printer control program memory 304 may be any conventional read-only memory or read-write memory suitable for storing micro-instructions for implementation by the printer control microprocessor 300.

The grayscale image memory 88 receives control, address, bank select and data out signals from the bus 82 and provides data input signals to the bus 82. More specifically, in response to control, address and bank select inputs, data may be written to or read from the memory 88. The bank select signals are utilized in a multi-formatting mode of operation, wherein (as previously described) two or more pictures may be read into the system and stored under the control of primary microprocessor 80, and then virtually simultaneously read out to the printer buffer memory 200 so that they may be printed in a desired array on a single sheet of printout paper by printer 84 under the control of printer control microprocessor 300. Any conventional random access memory (RAM) can be utilized to implement the grayscale image memory 88.

In operation, the primary microprocessor 80, as controlled by its program memory 86, receives grayscale image store and mode commands from the operator via the control panel 14 and the system bus 82. In response to a "store" command, the primary microprocessor 80, again as controlled by its program memory 86, transfers the grayscale image data, one video line at a time, as received from the grayscale image acquisition circuitry 40 (via the bus 82), to the grayscale image memory 88. A multiple number of grayscale images are stored in this manner.

After a multiple number of grayscale images has been stored in the grayscale memory 88, the primary microprocessor 80, again under the control of its program memory 86, transfers grayscale image data from the grayscale image memory 88 to the printer buffer memory 200 (typically 16 video lines at a time). The primary microprocessor 80 transmits commands to and receives status information from the printer control microprocessor 300 through the printer command/status "mailbox" memory. Thus, the printer command/status "mailbox" memory acts as a depository for commands from the primary microprocessor 80 to the printer control microprocessor 300, and for status information from the printer control microprocessor 300 to the primary microprocessor 80.

When printer buffer memory 200 is filled to a certain level or filled to capacity, status information to that effect is placed in the command/status mailbox memory 202, and the printer control microprocessor 300 (which polls the command/status mailbox memory 202 at prescribed intervals) becomes aware of the status of the printer buffer memory.

Microprocessor 300 in printer controller 81 then provides bus control information and/or address information to the memory select address decoder 302. Decoder 302 decodes the information provided by microprocessor 300 so as to select, in a one-out-of-three manner, one of the three elements: program memory 304, temporary "scratch pad" read/write memory 308, or system bus access control circuitry 310. Specifically, program memory 304 is chosen or selected when microprocessor 300 requires program instructions to carry out its operations. Temporary "scratch pad" read/write memory 308 is chosen when it is desired to transfer data from the printer buffer memory 200 via system bus interface circuitry 312, under the control of microprocessor 300 to the temporary "scratch pad" read/write memory 308. Finally, system bus access control circuitry 310 is chosen when it is desired to gain access to the system bus, via system bus interface circuitry 312, for the purpose of transmitting bus control or address information via the bus 82 to the other elements in FIG. 2b, or for the purpose of transmitting or receiving data.

The printer control microprocessor 300, under the control of instructions from the printer control program memory 304 and commands transferred to it from the primary microprocessor 80 (via the printer command/status "mailbox" memory 202), transmits grayscale image data from the printer buffer memory 200 to the printer 84 via port 316. However, in view of speed considerations (relating to the difference between the low printing speed of printer 84 and the high speed of the other data storage and manipulation operations), printer control microprocessor 300 can cause the data from image memory 88 to be stored temporarily in read/write memory 308, which acts as a buffer. Then, printing is accomplished by reading the data from memory 308 to printer 84.

It should be noted that, since the grayscale image memory 88, the printer buffer memory 200, and the printer command/status "mailbox" memory 202 are connected to the same system bus 82, which is accessed by both the primary microprocessor 80 and the printer controller 81, memory contention between the microprocessor 80 and the controller 81 could be a problem. Therefore, in accordance with the present invention, the system bus 82 is structured in such a way that only one of the microprocessors 80 and 300 can access the common memories 88, 200 and 202 at any instant in time. This is accomplished by the provision of system bus access control circuitry 310, associated with the printer controller 81, by means of which the primary microprocessor 80 is caused to suspend operation while the printer control microprocessor 300 accesses the common memory (printer buffer memory 200 and/or printer command/status "mailbox" memory 202).

More specifically, system bus access control circuitry 310 controls utilization of the bus 82 via control signals transmitted by circuitry 310 to the system bus interface circuitry 312. For example, when the command/status "mailbox" memory 202 indicates to the microprocessor 300 that access to the bus 82 by the microprocessor 300 is desired, microprocessor 300 acts via memory select address decoder 302 to select system bus access control circuitry 310, and system bus access control circuitry 310 generates a system bus request to the primary microprocessor 80. At the same time, control circuitry 310 generates a "wait" request signal to the microprocessor 300.

Then, when the primary microprocessor 80 wishes to grant access to the bus 82, a system bus grant signal is transmitted to the system bus access control circuitry 310, and the "wait" request is removed from the printer control microprocessor 300. At the same, system bus access control circuitry 310 generates a control signal to the system bus interface interface circuitry 312, thus allowing microprocessor 300 to have access to the bus 82. Finally, when data is to be received by microprocessor 300 via input port 314 from the printer 84, the input port 314 is selected by an input select signal transmitted via input/output port select address decoder 306, which decodes bus control and/or address information from the microprocessor 300 in order to transmit the input select signal. Similarly, when it is desired to transmit data to the printer via output port 316, the output port 316 is selected by an output select signal from the input/output port select address decoder.

It is to be noted that the memory select address decoder 302 and input/output port select address decoder 306 are conventional decoder circuits well known to those of skill in the art. Similarly, the system bus access control circuitry 310 comprises conventional circuitry readily available in the marketplace for processing the logical conditions described above, and for issuing the control signals also described above. System bus interface circuitry 312 is a conventional bus interface circuit well known to those of skill in the art.

Figure 3A:
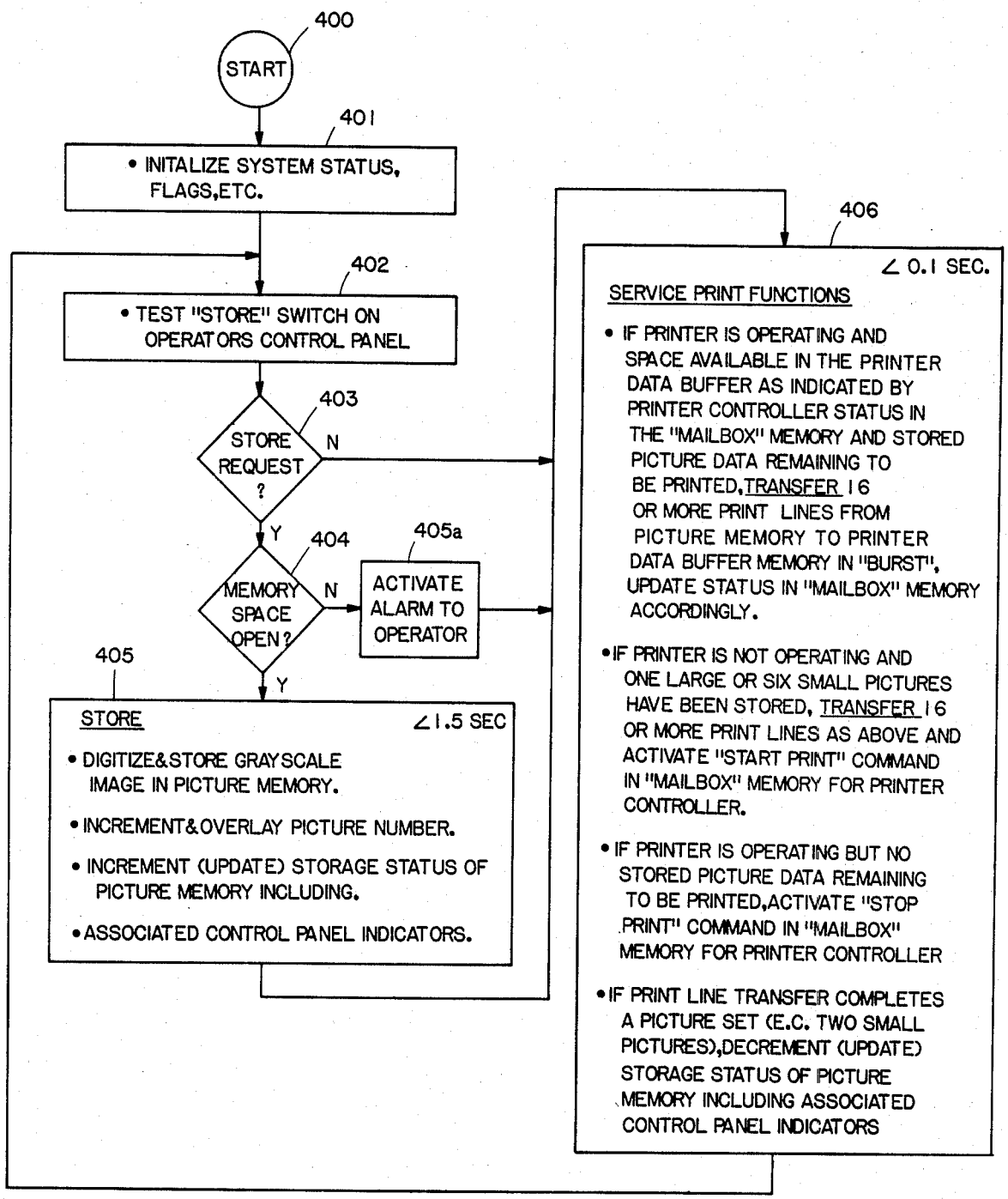
Figure 3B:
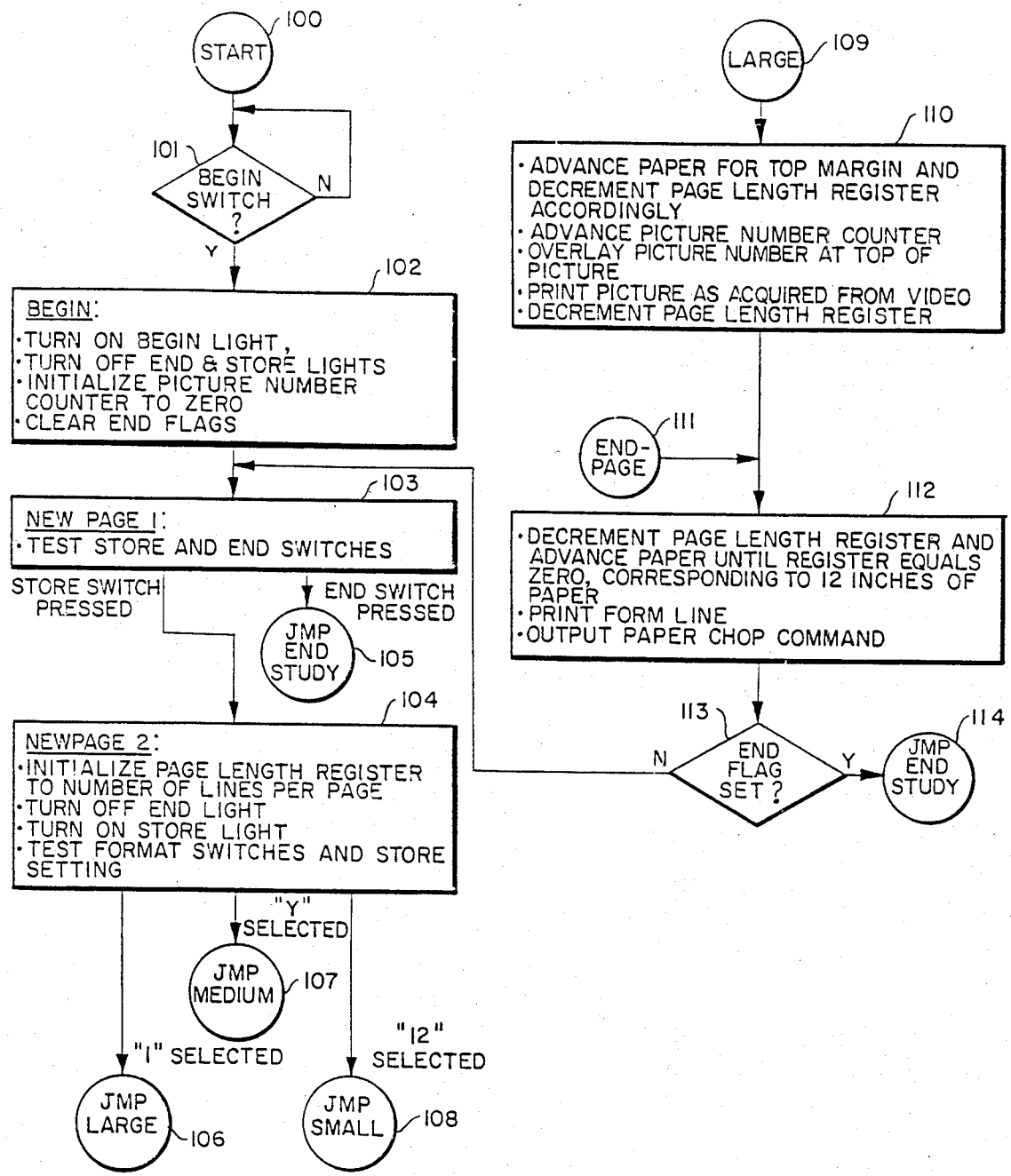
Figure 3C:
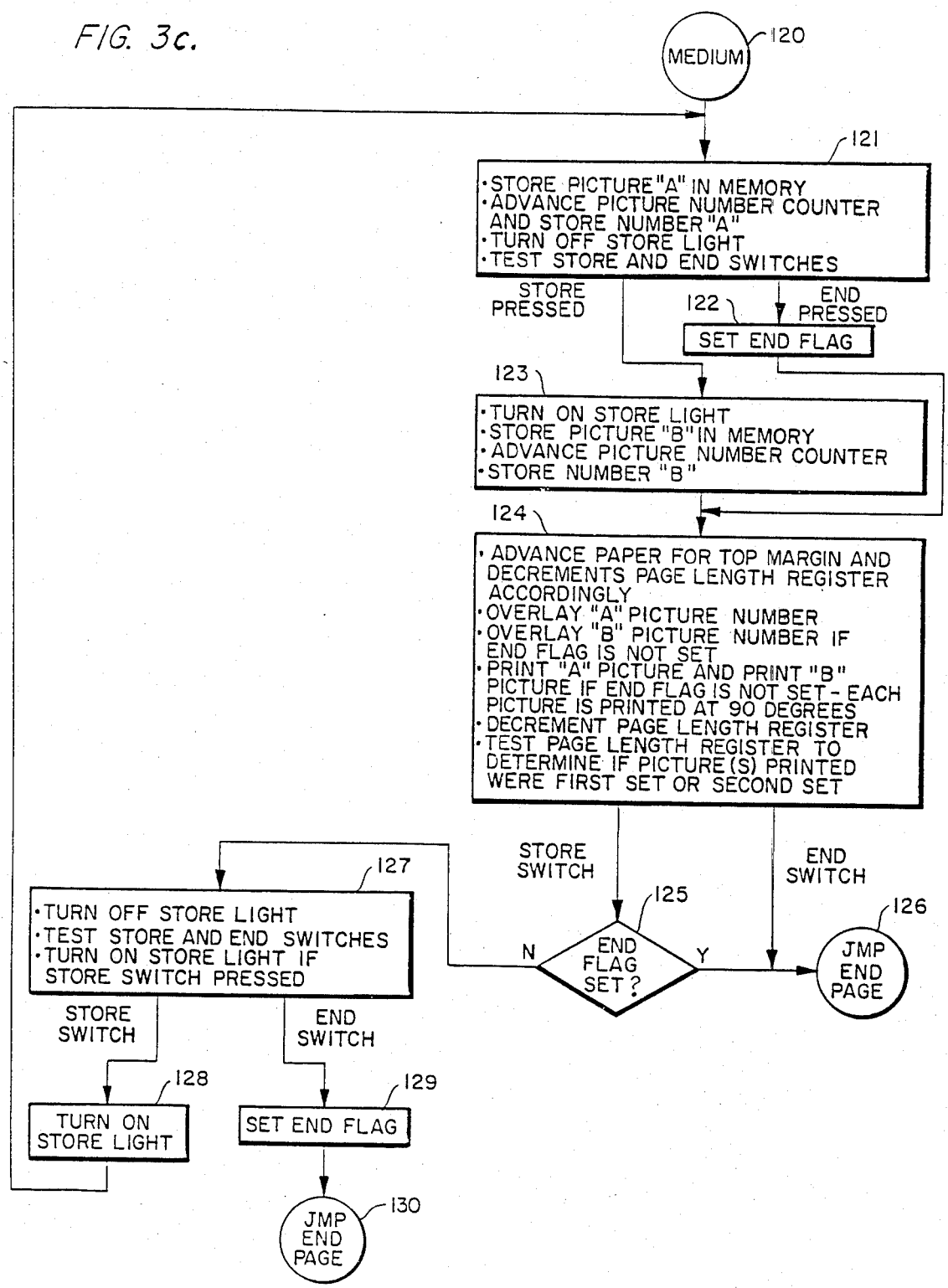
Figure 3D:
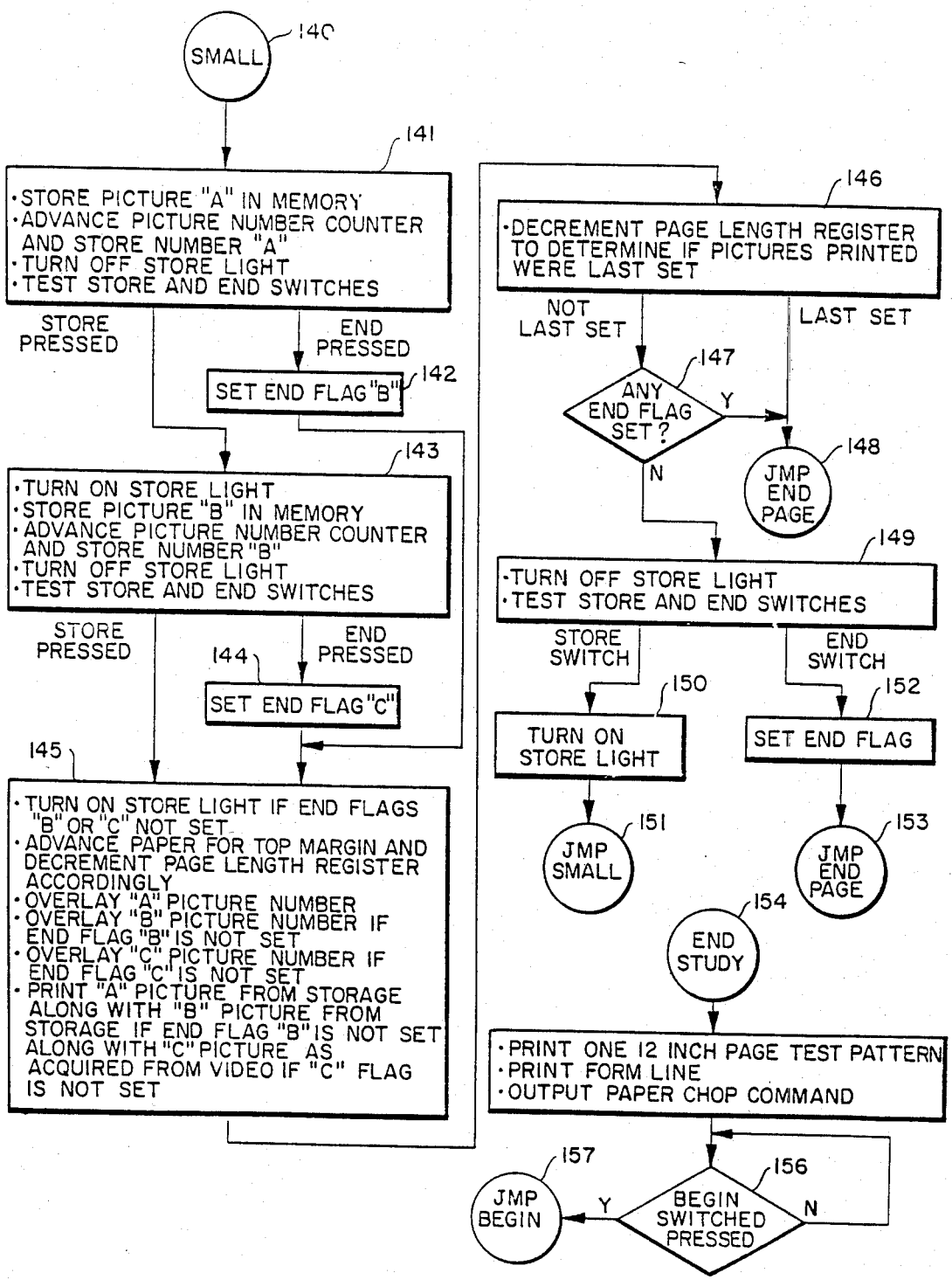
Figure 3E:
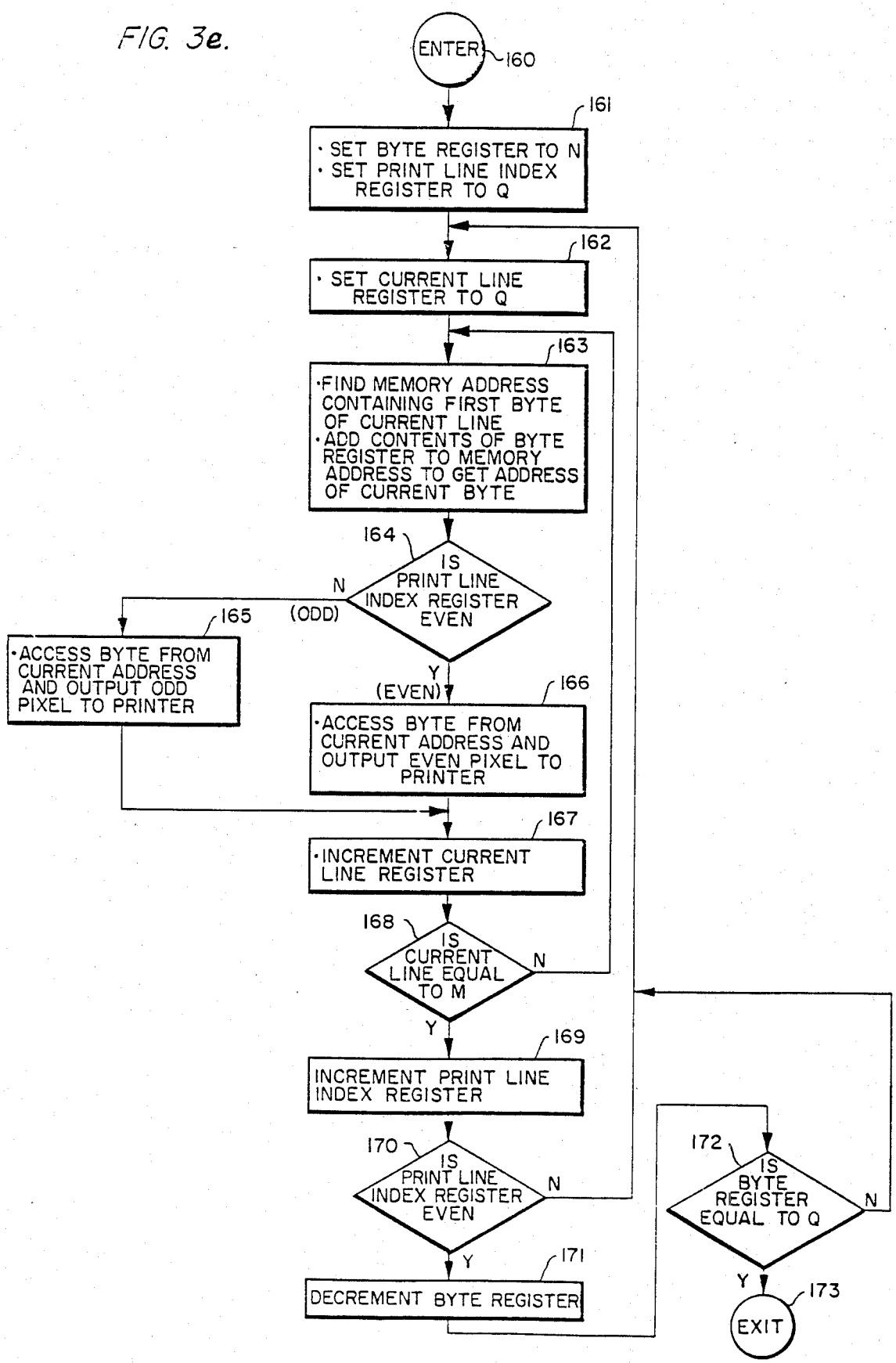
Figure 4:
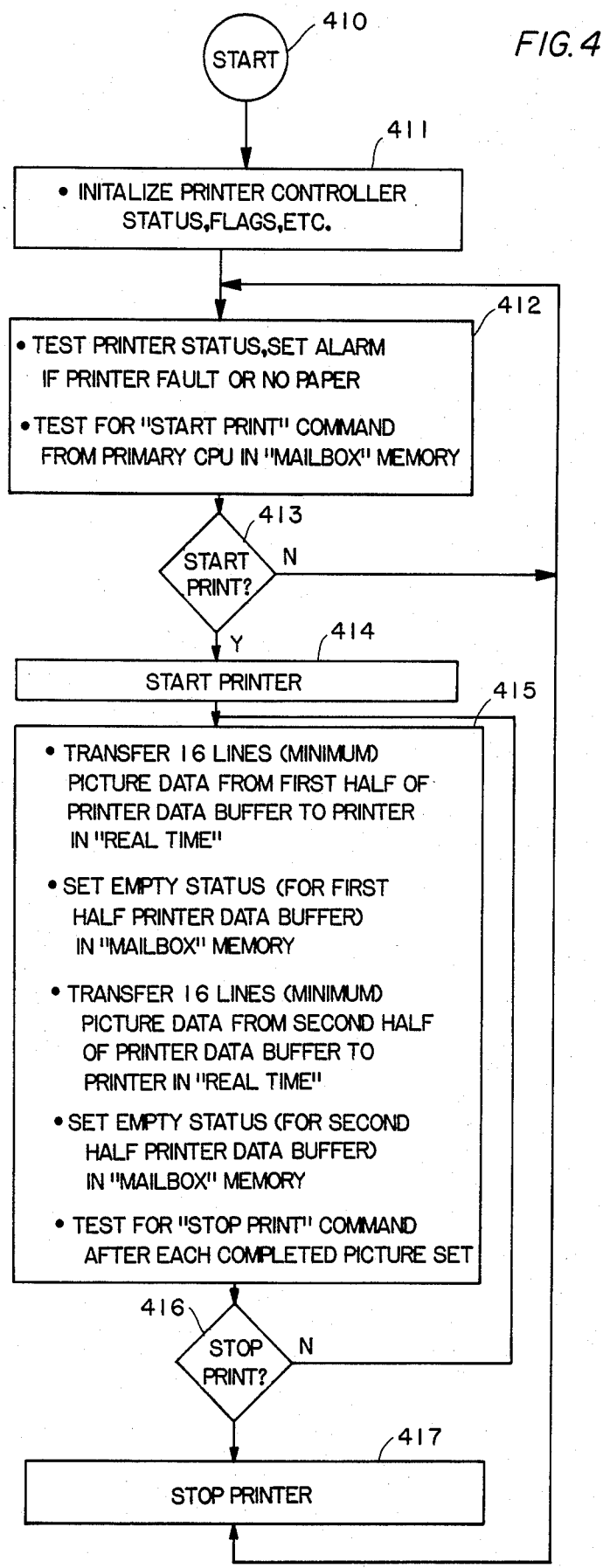
FIG. 4 is a flow chart of the operations performed by the printer controller 81 (printer control microprocessor 300 of FIGS. 2a and 2b.

FIG. 3a is a flow chart of the general operations performed by microprocessor 80, while FIGS. 3b through 3d are flow charts of the operations performed by the microprocessor 80 in conjunction with the accomplishment of the multi-formatting mode of operation of the system. FIG. 3e is a flow chart of those operations of the microprocessor 80 which are performed in order to print a previously stored picture rotated by 90 degrees. FIG. 4 is a flow chart of the operations performed by the microprocessor 300 and printer controller 81.

As indicated in FIG. 3a, microprocessor 80 initializes system status and various flags (block 401), and then tests a switch located on the system control panel 14 (block 402). If the operator has not requested storage of image data (block 403), service print functions (block 406) are implemented. Conversely, if image data storage has been requested, microprocessor 80 checks to see whether or not memory space is available (block 404). If memory space is available, the storage procedure (block 405) is implemented, followed by the service print functions (block 406). If memory space is not available, an alarm is activated (block 405a).

The flow charts of FIGS. 3b-3e are considered to be of sufficient detail to make further discussion unnecessary. Moreover, a detailed discussion of these flow charts is contained in the aforementioned copending application (which is incorporated herein by reference).

Referring to FIG. 4, which is a flow chart of the operations performed by microprocessor 300 in printer controller 81, microprocessor 300 initializes printer controller status and various flags (block 411), and then tests the printer status. That is to say, in testing printer status (block 412), microprocessor 300 sets an alarm if the printer indicates a "fault" status or if there is no paper in the printer. A further test for "start print" command from the primary microprocessor 80 is conducted by polling the command/status "mailbox" memory 202.

Microprocessor 300 then tests to see whether or not printing is to be started (block 413). If so, the printer is started (block 414), and various transfer and status adjusting operations are carried out (block 415). If printing is not to be started (block 413), the printer is stopped (block 417).

After the carrying out of the transfer and status adjusting operations of block 415, the microprocessor 300 checks to see whether or not printing should be stopped (block 416). If it is not to be stopped, the program of microprocessor 300 branches back to the beginning of the transfer and status adjustment operations (block 415). If printing is to be stopped, the printer is stopped (block 417).

While preferred forms and arrangements have been shown in illustrating the invention, it is to be clearly understood that various changes in detail and arrangement may be made without departing from the spirit and scope of this disclosure.

What is claimed is:

1. A method of reproducing images on a printer in printed form, said method comprising the steps of:
   (a) receiving digital image data corresponding to said images to be reproduced;
   (b) storing said digital image data corresponding to said images to be reproduced in a first storage area;
   (c) transferring digital image data, corresponding to images to be printed, from said first storage area to a second storage area;
   (d) simultaneously with step (b), reading out stored digital image data from said second storage area, and providing same to said printer; and
   (e) printing said images in correspondence to said digital image data provided to said printer;
   wherein steps (a), (b) and (c) are carried out by a primary microprocessor, and step (d) is carried out by a printer control microprocessor.

2. A method of reproducing images on a printer in printed form, said method comprising the steps of:
   (a) receiving digital image data corresponding to said images to be reproduced;
   (b) storing said digital image data corresponding to said images to be reproduced in a first storage area;
   (c) transferring digital image data, corresponding to images to be printed, from said first storage area to a second storage area;
   (d) simultaneously with step (b), reading out stored digital image data from said second storage area, and providing same to said printer; and
   (e) printing said images in correspondence to said digital image data provided to said printer;
   said method comprising the additional step, after step (a), of processing said digital image data so as to develop additional digital image data corresponding to a rotated version of said images to be reproduced.

3. A system for reproducing images on a printer in printed form, comprising:
   acquisition means for receiving digital image data corresponding to said images to be reproduced;
   first processor means for processing said digital image data received by said acquisition means and providing a processed data output corresponding to said images to be reproduced;
   printer buffer memory means for storing said processed data output corresponding to said images to be reproduced;
   second processor means for controlling said printer buffer memory means so as to read out, from said printer buffer memory means, said processed data corresponding to said images to be reproduced so as to provide a print control output; and
   printing means responsive to said print control output for printing said images in correspondence thereto, whereby to reproduce said images in printed form.

4. The system of claim 3, wherein said first processor means comprises a primary microprocessor and said second processor means comprises a printer control microprocessor.

5. The system of claim 3, further comprising image memory means for storing said processed data output provided by said first processor means until such time as said images are to be reproduced, whereupon said processed data output is transferred to said printer buffer memory means.

6. The system of claim 5, wherein said first processor means transfers said processed data output to said printer buffer memory means when said images are to be reproduced.

7. A system for reproducing images on a printer in printed form, comprising:
   acquisition means for receiving digital image data corresponding to said images to be reproduced;
   first processor means for processing said digital image data received by said acquisition means and providing a processed data output corresponding to said images to be reproduced;
   printer buffer memory means for storing said processed data output corresponding to said images to be reproduced;
   second processor means for reading out, from said printer buffer memory means, said processed data corresponding to said images to be reproduced so as to provide a print control output; and
   printing means responsive to said print control output for printing said images in correspondence thereto, whereby to reproduce said images in printed form;
   wherein said first processor means processes said digital image data so as to derive further digital data corresponding to a rotated verion of said images.

8. A system for reproducing images on a printer in printed form, comprising:
   acquisition means for receiving digital image data corresponding to said images to be reproduced;
   first processor means for processing said digital image data received by said acquisition means and providing a processed data output corresponding to said images to be reproduced;
   printer buffer memory means for storing said processed data output corresponding to said images to be reproduced;
   second processor means for reading out, from said printer buffer memory means, said processed data corresponding to said images to be reproduced so as to provide a print control output; and printing means responsive to said print control output for printing said images in correspondence thereto, whereby to reproduce said images in printed form;

said system further comprising printer command/status mailbox memory means for receiving commands from said first processor means and for receiving status information from said second processor means.

9. The system of claim 8, wherein said commands are provided to said second processor means.

10. The system of claim 8, wherein said status information is provided to said first processor means.

11. A system for reproducing images on a printer in printed form, comprising:

acquisition means for receiving digital image data corresponding to said images to be reproduced;

first processor means for processing said digital image data received by said acquisition means and providing a processed data output corresponding to said images to be reproduced;

printer buffer memory means for storing said processed data output corresponding to said images to be reproduced;

second processor means for reading out, from said printer buffer memory means, said processed data corresponding to said images to be reproduced so as to provide a print control output; and printing means responsive to said print control output for printing said images in correspondence thereto, whereby to reproduce said images in printed form;

said system further comprising inhibiting means for inhibiting operation of one of said first and second processor means when the other of said first and second processor means is operating.

12. The system of claim 11, wherein the operation of said first processor means is inhibited when said second processor means is operating.

13. A method of reproducing, on a printer in printed form, an image corresponding to digital image scan data derived from scanning an image source to provide scan signals and converting said scan signals into said digital image scan data, said method comprising the steps of:

(a) receiving said digital image scan data corresponding to said scan signals derived from scanning said image source;

(b) storing said digital image scan data in a first storage area;

(c) transferring said digital image scan data from said first storage area to a second storage area;

(d) simultaneously with step (b), reading out from said second storage area digital image scan data previously stored therein, and providing same to said printer; and (e) printing said image in correspondence to said digital image scan data provided to said printer.

14. The method of claim 13, wherein steps (a), (b) and (c) are carried out by a primary microprocessor, and step (d) is carried out by a printer control microprocessor.

15. The method of claim 13, comprising the additional step, after step (a), of processing said digital image scan data so as to develop additional digital image scan data corresponding to a rotated version of said image source.

* * * * *